(12) United States Patent
Nakayama et al.

(10) Patent No.: US 9,091,521 B2
(45) Date of Patent: Jul. 28, 2015

(54) SURFACE TEXTURE MEASURING APPARATUS

(71) Applicant: MITUTOYO CORPORATION, Kanagawa (JP)

(72) Inventors: Tatsuki Nakayama, Hiroshima (JP); Minoru Katayama, Hiroshima (JP)

(73) Assignee: MITUTOYO CORPORATION, Kanagawa (JP)

(*) Notice: Subject to any disclaimer, the term of this patent is extended or adjusted under 35 U.S.C. 154(b) by 450 days.

(21) Appl. No.: 13/657,198

(22) Filed: Oct. 22, 2012

(65) Prior Publication Data

US 2013/0133409 A1 May 30, 2013

(30) Foreign Application Priority Data

Nov. 29, 2011 (JP) ................................. 2011-260205

(51) Int. Cl.
  *G01B 5/28* (2006.01)
  *G01B 3/00* (2006.01)
  *G01B 7/34* (2006.01)
(52) U.S. Cl.
  CPC *G01B 3/008* (2013.01); *G01B 5/28* (2013.01); *G01B 7/34* (2013.01)
(58) Field of Classification Search
  None
  See application file for complete search history.

(56) References Cited

U.S. PATENT DOCUMENTS

| 6,209,217 | B1 | 4/2001 | Tsuruta et al. |
| 2004/0168332 | A1* | 9/2004 | Hama et al. ............... 33/551 |
| 2012/0227476 | A1 | 9/2012 | Nakayama |
| 2012/0266475 | A1 | 10/2012 | Nakayama et al. |

FOREIGN PATENT DOCUMENTS

| DE | 19617022 | 12/1997 |
| EP | 2515069 | 10/2012 |
| JP | 2000-111334 | 4/2000 |

OTHER PUBLICATIONS

Search report from E.P.O., mail date is Mar. 19, 2013.

* cited by examiner

*Primary Examiner* — Robert R Raevis
(74) *Attorney, Agent, or Firm* — Greenblum & Bernstein, P.L.C.

(57) ABSTRACT

Surface texture measuring apparatus includes a measurement arm table storing mass of an entire measurement arm, an arm length from a supporting point to a stylus, and a horizontal and vertical barycenter of the measurement arm in a horizontal posture for each type of the measurement arm in which a second measurement arm having a different mass is attached; a measurement arm specifier; an inclination angle detector detecting an inclination angle of the detector; and a controller reading out from the measurement arm table the mass, the arm length, the horizontal barycenter, and the vertical barycenter for a specified measurement arm, calculating a difference between a measurement force of the measurement arm in the horizontal posture and a measurement force of the measurement arm in an inclined posture based on the read-out information and the inclination angle detected by the inclination angle detector, and adjusting a measurement force.

12 Claims, 11 Drawing Sheets

| Type | Measurement arm | | M | L | Gx | Gz |
|---|---|---|---|---|---|---|
| | 1st measurement arm | 2nd measurement arm | | | | |
| 1 | A1 | A21 | | | | |
| 2 | | A22 | | | | |
| 3 | | A23 | | | | |
| 4 | | A24 | | | | |
| 5 | | A25 | | | | |
| 6 | | A26 | | | | |
| 7 | | A27 | | | | |

Fig. 11 ured object. The surface texture measuring apparatus is further capable of tilting a detector main body including the stylus (measurement arm) so as to enable measurement on an inclined surface of the measured object. In addition, the surface texture measuring apparatus can automatically adjust a measurement force to be appropriate for a combination of a stylus and a measured surface.
SURFACE TEXTURE MEASURING APPARATUS

CROSS-REFERENCE TO RELATED APPLICATIONS

The present application claims priority under 35 U.S.C. §119 of Japanese Application No. 2011-260205, filed on Nov. 29, 2011, the disclosure of which is expressly incorporated by reference herein in its entirety.

BACKGROUND OF THE INVENTION

1. Field of the Invention

The present invention relates to a surface texture measuring apparatus. More specifically, the present invention relates to a surface texture measuring apparatus capable of keeping a measuring force constant regardless of a posture of a measurement arm having a stylus that makes contact with a surface of a measured object.

2. Description of Related Art

A surface texture measuring apparatus is known which moves a stylus in contact with a surface of a measured object along the surface thereof, detects a displacement of the stylus (displacement in a direction orthogonal to a travel direction of the stylus) generated at this point due to a shape and roughness of the surface of the measured object, and, from the displacement, measures a surface texture such as the shape and roughness of the surface of the measured object.

Among the surface texture measuring apparatuses, a type of surface texture measuring apparatus has been suggested which pre-prepares styli (measurement arms) of various shapes so as to enable measurement on various shapes of measured portions in a measured object, and performs measurement while switching styli to those which are most appropriate for the shape of the measured portion of the measured object. The surface texture measuring apparatus is further capable of tilting a detector main body including the stylus (measurement arm) so as to enable measurement on an inclined surface of the measured object. In addition, the surface texture measuring apparatus can automatically adjust a measurement force to be appropriate for a combination of a stylus and a measured surface.

For example, Japanese Patent No. 3992853 describes a technology in which a measurement force command value is pre-stored in a table for each combination of a stylus holder type, a stylus type, a measurement direction, and an inclination angle of the detector main body; a user specifies the stylus holder type, the stylus type, and the measurement direction when a stylus holder or a stylus is changed; a measurement force command value corresponding to the specifications and the inclination angle of the detector main body detected by an angle detector is read out from the table; and the measurement force is automatically adjusted according to the read-out measurement force command value.

Thus, it is possible to adjust a measurement force to be most appropriate for the measurement direction (upward or downward, for example) and the inclination angle of the main body in addition to the combination of the stylus holder type and the stylus type. In other words, it is possible to adjust a measurement force to be a predetermined level even when a stylus or a holder is changed, or a measurement direction or an angle is changed.

The technology described in Japanese Patent No. 3992853, however, needs to convert to a table and store in a memory, in advance, each measurement force command value for each combination of the stylus holder type, the stylus type, and the inclination angle of the detector main body. Depending on a shape of the measured object, there may be a desire to use an apparatus with an inclination angle other than that stored in the table. In such a case, the technology described in Japanese Patent No. 3992853 cannot perform accurate measurement because a measurement force command value for the desired inclination angle is not stored.

In addition, when an inclination angle for the detector main body is allowed to be finely specified, required memory capacity is significantly increased. Further, when a user wants to use an unregistered stylus, the user needs to obtain a measurement force command value for the new stylus that the user wants to use, the stylus holder type, the measurement direction, and the inclination angle, which increases the user's workload.

An advantage of the present invention is to provide a surface texture measuring apparatus capable of performing accurate measurement even when an inclination angle of a detector displacement mechanism is changed to a predetermined angle, while achieving a smaller memory capacity and reducing a workload for a user even when use of a new stylus is desired.

SUMMARY OF THE INVENTION

A surface texture measuring apparatus of the present invention includes a detector, a stage, a relative displacement mechanism, and a detector inclination mechanism. The detector has a measurement arm, a displacement detector, and a measurement force applier. The measurement arm is supported by a main body in a state capable of performing circular arc motion pivoting on a supporting axis as a supporting point and is provided with a stylus at a tip thereof. The displacement detector detects an amount of circular arc motion of the measurement arm. The measurement force applier urges the measurement arm in a circular arc motion direction and applies a measurement force to the stylus. The stage carries a measured object. The relative displacement mechanism includes a detector displacement mechanism moving the detector in an axis direction of the measurement arm, and relatively moves the detector and the stage. The detector inclination mechanism tilts a movement direction of the detector displacement mechanism with respect to the stage. In a state where the stylus is in contact with a surface of the measured object, the displacement detector detects the amount of circular arc motion of the measurement arm while the relative displacement mechanism relatively moves the detector and the stage. A surface texture of the measured object is then measured based on the circular arc motion amount. In such a surface texture measuring apparatus, the measurement arm is configured with a first measurement arm supported by the main body in a state capable of performing a circular arc motion pivoting on the supporting axis as a supporting point, and a second measurement arm attachably and detachably provided at a tip of the first measurement arm via an attach-detach mechanism and having the stylus at a tip. The surface texture measuring apparatus further includes a measurement arm table (also referred to as a memory), a measurement arm specifier, an inclination angle information provider, and a control device. The measurement arm table stores a mass M of an entire measurement arm, an arm length L from the supporting point to the stylus, and a horizontal barycenter Gx and a vertical barycenter Gz of the measurement arm in a horizontal posture, for each type of the measurement arm to which a second measurement arm having a different mass is attached. The measurement arm specifier specifies a type of the measurement arm. The inclination angle information provider provides information on an inclination angle of the detector inclined by the detector inclination mechanism. The control device reads out from the measurement arm table the mass M, the arm length L, the horizontal barycenter Gx, and the vertical barycenter Gz for the measurement arm specified by the measurement arm specifier. The control device further calculates a difference between a measurement force of the measurement arm in the horizontal posture and a measurement force of the measurement arm in the inclined posture based on the information from the measurement arm table and the inclination angle information from the inclination angle information provider. The control device then adjusts a measurement force of the measurement force applier using the difference as a correction value.

According to such a configuration, after the second measurement arm is replaced so as to correspond to the surface shape of the measured object, the measurement arm specifier specifies a measurement arm including the post-replacement second measurement arm. The control device then reads out from the measurement arm table the mass M, the arm length L, the horizontal barycenter Gx, and the vertical barycenter Gz for the specified measurement arm. Based on this information and the inclination angle information provided from the inclination angle information provider, a difference between the measurement force of the measurement arm in the horizontal posture and the measurement force of the measurement arm in the inclined posture is calculated. The measurement force of the measurement force provider is adjusted using the difference as a correction value.

Accordingly, by specifying the type of the measurement arm, a most appropriate measurement force can be obtained by calculation from the mass M, the arm length L, the horizontal barycenter Gx, the vertical barycenter Gz, and the inclination angle information. Thereby, it is possible to accurately measure a measurement surface of the measured object having any angle. Further, required memory capacity can be reduced since only one set of parameters (the mass M of the entire measurement arm, the arm length L, the horizontal barycenter Gx, and the vertical barycenter Gz) for each type of the measurement arm including the second measurement arm needs to be stored. In addition, when a user wants to use a new measurement arm, the user does not need to register the measurement force command value thereof. Instead, the user only needs to register parameters, which the user can relatively easily obtain. Thus, it is possible to reduce the user's workload.

In the surface texture measuring apparatus of the present invention, the inclination angle information provider is preferably configured with an inclination angle detector detecting an inclination angle of the detector. According to such a configuration, the inclination angle of the detector is automatically detected by the inclination angle detector. Thereby, the burden of the user can be reduced. In other words, because a user does not have to manually input the inclination angle of the detector through an inputter, it is possible to reduce the burden of the user.

In the surface texture measuring apparatus of the present invention, the control device preferably obtains the difference between the measurement force of the measurement arm in the horizontal posture and the measurement force of the measurement arm in the inclined posture from the mass M of the entire measurement arm, the arm length L, the horizontal barycenter Gx, the vertical barycenter Gz, and an inclination angle θ1 of the detector with a formula:

$$\text{Difference} = M \times L \times (Gx - Gx')$$

where $$Gx' = \sqrt{(Gx^2 + Gz^2)} \times \cos(\theta 3)$$

$$\theta 3 = \theta 2 - \theta 1$$

$$\theta 2 = \text{Arctan}(Gz \div Gx)$$

According to such a configuration, the difference between the measurement force of the measurement arm in the horizontal posture and the measurement force of the measurement arm in the inclined posture is automatically calculated from the mass M of the entire measurement arm, the arm length L, the horizontal barycenter Gx, the vertical barycenter Gz, and the inclination angle θ1 of the detector. Thus, a measurement can be performed with a proper measurement force.

In the surface texture measuring apparatus of the present invention, the measurement arm specifier preferably includes a mass calculator obtaining the mass of the entire measurement arm including the post-replacement second measurement arm when the second measurement arm is replaced with respect to the first measurement arm. The control device also preferably performs calculation by reading out from the measurement arm table the arm length L, the horizontal barycenter Gx, and the vertical barycenter Gz for the measurement arm corresponding to the mass calculated by the mass calculator. According to such a configuration, when the second measurement arm is replaced with respect to the first measurement arm, the mass calculator obtains the mass of the entire measurement arm including the post-replacement second measurement arm. The control device then reads out from the measurement arm table the arm length L, the horizontal barycenter Gx, and the vertical barycenter Gz for the measurement arm corresponding to the mass calculated by the mass calculator, and automatically performs calculation. Accordingly, it is not necessary for a user to specify the measurement arm including the second measurement arm. Thereby, it is possible to eliminate specifying errors and to reduce the burden of the user.

In the surface texture measuring apparatus of the present invention, the measurement force applier preferably includes a voice coil urging the measurement arm in the circular arc motion direction pivoting on the supporting axis as a supporting point. The mass calculator preferably adjusts an electric current conducted in the voice coil while monitoring the circular arc motion amount of the measurement arm detected by the displacement detector and obtains the mass of the post-replacement measurement arm by comparing a measurement force in a state where the circular arc motion amount of a reference measurement arm has become a predetermined set value and a measurement force in a state where the circular arc motion amount of the post-replacement measurement arm has become a predetermined set value. According to such a configuration, the electric current conducted in the voice coil is adjusted while the circular arc motion amount of the measurement arm detected by the displacement detector is monitored, and the mass of the post-replacement measurement arm is obtained by comparing the measurement force in a state where the circular arc motion amount of the reference measurement arm has become a predetermined set value and the measurement force in a state where the circular arc motion amount of the post-replacement measurement arm has become a predetermined set value.

Thereby, the post-replacement measurement arm can be automatically identified. Therefore, the user's work can be reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

<Explanation of the Surface Texture Measuring Apparatus (See FIGS. 1 to 8)>

Figure 1:
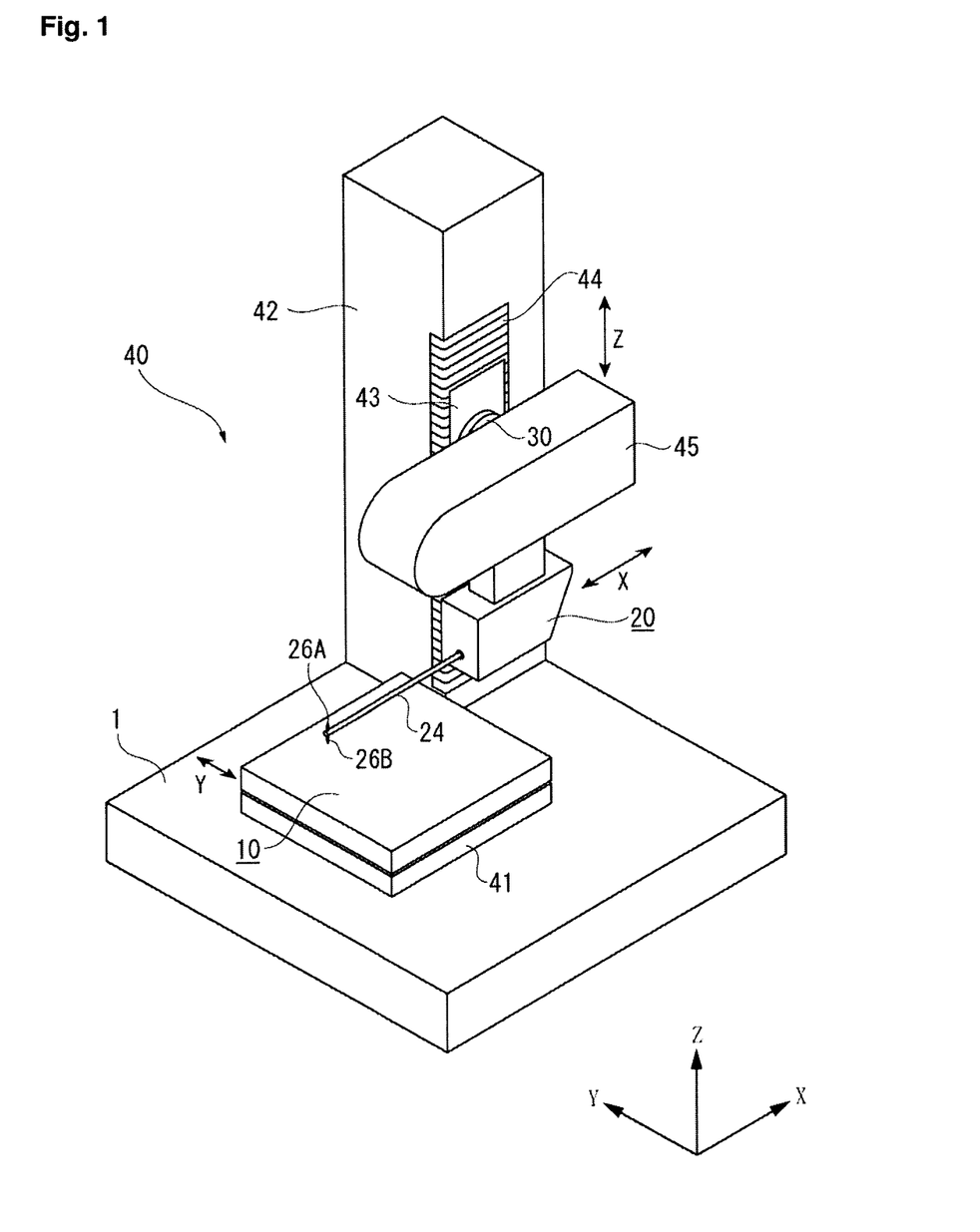
FIG. 1 is a perspective view showing a surface texture measuring apparatus according to an embodiment of the present invention.

A surface texture measuring apparatus according to the present embodiment includes, as shown in FIG. 1, a base 1, a stage 10 placed on the base 1 and carrying a measured object on an upper surface thereof, a stylus displacement detector 20 having styli 26A and 26B that are brought into contact with a surface of the measured object, and a relative displacement mechanism (relative displacer) 40 that moves the stylus displacement detector 20 and the stage 10 relative to each other.

The relative displacement mechanism 40 includes a Y-axis drive mechanism 41 that is provided between the base 1 and the stage 10 and moves the stage 10 in one horizontal direction (Y-axis direction), a column 42 erected on an upper surface of the base 1, a Z-slider 43 provided movably in a vertical direction (Z-axis direction) along the column 42, a Z-axis drive mechanism 44 that raises and lowers the Z-slider 43 in the vertical direction, and an X-axis drive mechanism 45 provided to the Z-slider 43 and moving the stylus displacement detector 20 in a perpendicular direction (X-axis direction: axis direction of a measurement arm 24 (described later)) with respect to a displacement direction (Y-axis direction) of the stage 10 and a displacement direction (Z-axis direction) of the Z-slider 43.

Accordingly, the relative displacement mechanism 40 is configured with a three-dimensional displacement mechanism including the Y-axis drive mechanism 41 that moves the stage 10 in the Y-axis direction, the Z-axis drive mechanism 44 that moves the stylus displacement detector 20 in the Z-axis direction, and the X-axis drive mechanism 45 as a detector displacement mechanism (detector displacer) that moves the stylus displacement detector 20 in the X-axis direction (axis direction of the measurement arm 24). Further, a swivel mechanism 30 is provided between the Z-slider 43 and the X-axis drive mechanism 45 as a detector inclination mechanism (detector inclinator) that inclines a displacement direction of the X-axis drive mechanism 45 with respect to the stage 10. Thereby, the stylus displacement detector 20, along with the X-axis drive mechanism 45, is configured to be able to change a posture thereof to an inclined posture in addition to a horizontal posture.

Figure 2:
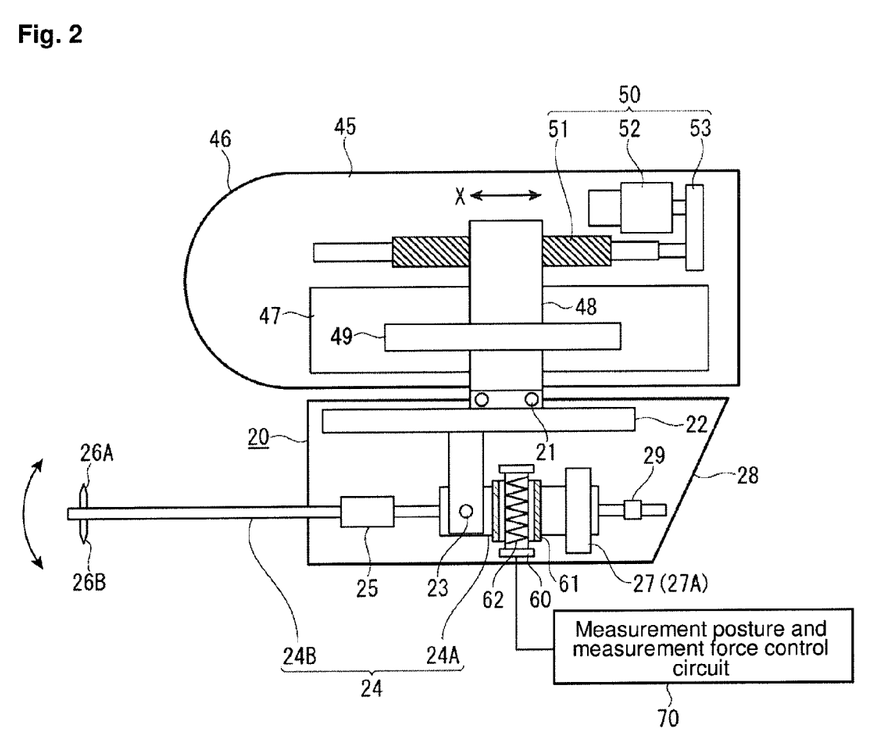
FIG. 2 illustrates an X-axis drive mechanism and a stylus displacement detector of the same embodiment.

The Y-axis drive mechanism 41 and the Z-axis drive mechanism 44 are configured with, for example, a feed screw mechanism (omitted from the drawings) having a ball screw shaft and a nut threadably mounted on the ball screw shaft. The X-axis drive mechanism 45 includes, as shown in FIG. 2, a drive mechanism main body 46 fixed to the Z-slider 43 via the swivel mechanism 30, a guide rail 47 provided to the drive mechanism main body 46 in parallel to the X-axis direction, an X-slider 48 provided movably in the X-axis direction along the guide rail 47, an X-axis position detector 49 detecting an X-axis direction position of the X-slider 48, and a feed mechanism 50 moving the X-slider 48 along the guide rail 47. The feed mechanism 50 is configured with a feed screw shaft 51, a motor 52 as a drive source, and a rotation transmission mechanism 53. The feed screw shaft 51 is provided to the drive mechanism main body 46 in parallel to the guide rail 47 and is threadably mounted to the X-slider 48. The rotation transmission mechanism 53 transmits rotation of the motor 52 to the feed screw shaft 51. The rotation transmission mechanism 53 is configured with a mechanism including, for example, a gear train, a belt, a pulley, and the like.

The stylus displacement detector 20 includes, as shown in FIG. 2, a bracket 22, the measurement arm 24, a pair of styli 26A and 26B provided at a tip of the measurement arm 24, a displacement detector 27, a balance weight 29, a measurement arm posture switching mechanism 60, and a casing 28. The bracket 22 acts as a main body and is detachably hung and supported by the X-slider 48 via a bolt 21. The measurement arm 24 is supported by the bracket 22 to be swingable in the vertical direction (movable in a circular arc direction) pivoting on a rotation axis 23 as a supporting axis. The displacement detector 27 detects an amount of circular arc motion (displacement amount in the Z-axis direction) of the measurement arm 24. The balance weight 29 is provided to the measurement arm 24 such that a position thereof is adjustable. The measurement arm posture switching mechanism 60 switches a position of the measurement arm 24 between a position urged in a direction (upward, for example) of the circular arc motion direction or a position urged in the other direction (downward). The casing 28 covers the bracket 22, the measurement arm 24, the displacement detector 27, the balance weight 29, and the measurement arm posture switching mechanism 60.

The measurement arm 24 is configured with a first measurement arm 24A and a second measurement arm 24B. The first measurement arm 24A is supported by the bracket 22 so as to be able to perform a circular arc motion in the vertical direction pivoting on the rotation axis 23. The second measurement arm 24B is replaceably provided at a tip of the first measurement arm 24A via an attach-detach mechanism (attacher-detacher) 25. The attach-detach mechanism 25 has a magnetic mechanism that pulls and attaches the first measurement arm 24A and the second measurement arm 24B by a magnetic force. The styli 26A and 26B protrude from the second measurement arm 24B in the circular arc motion direction. That is, an upward stylus 26A and a downward stylus 26B protrude in an up-down direction perpendicular to the second measurement arm 24B.

Figure 3:
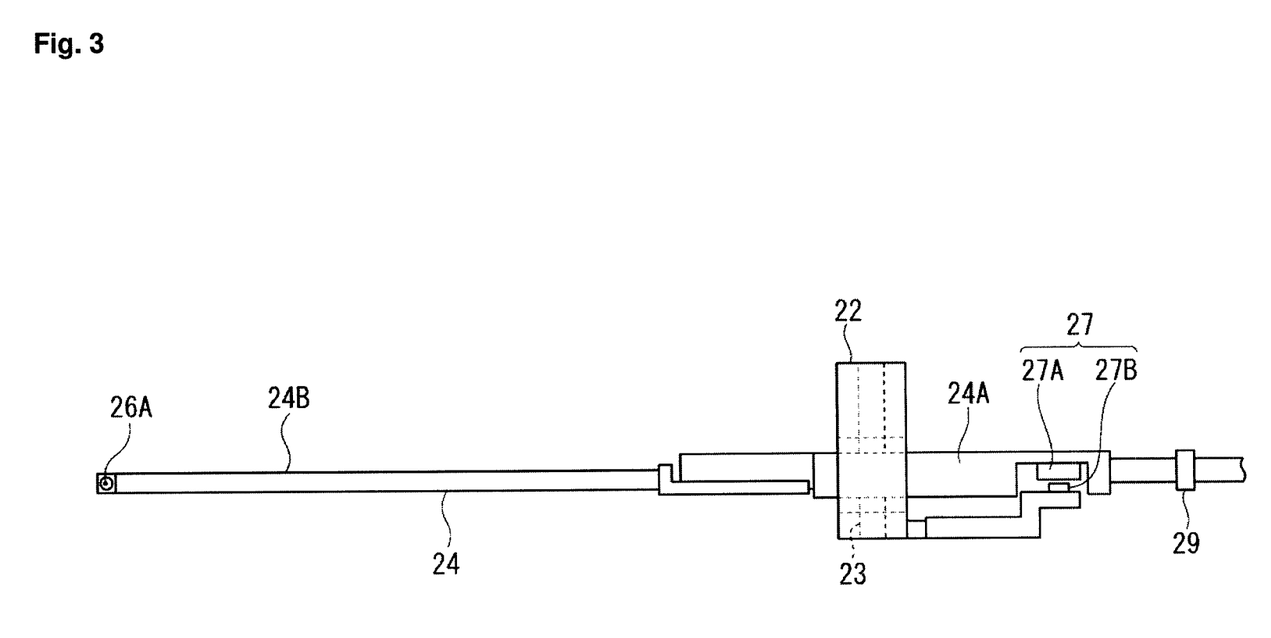
FIG. 3 is a plan view showing a relationship between a measurement arm and a displacement detector of the same embodiment.

The displacement detector 27 is provided to follow a range of a circular arc motion of the measurement arm 24, as shown in FIG. 3. The displacement detector 27 is configured with a position detector outputting pulse signals in a number corresponding to the amount of the circular arc motion of the measurement arm 24. Specifically, the displacement detector 27 is configured with a scale 27A and a detection head 27B. The scale 27A is provided to the measurement arm 24 and is curved in the direction of the circular arc motion of the measurement arm 24. The detection head 27B is attached to the bracket 22 acting as the main body so as to face the scale 27A. A detection surface of the scale 27A is placed on an axis line of the measurement arm 24 and also on a surface defined by the circular arc motion of the measurement arm 24. Accordingly, the detection surface of the scale 27A, the measurement arm 24, and each tip of the styli 26A and 26B are placed on the same axis line. The balance weight 29 is provided such that the position thereof is adjustable in an axis direction of the measurement arm 24 so that a weight of a first measurement arm 24A side and a weight of a second measurement arm 24B side are balanced at the rotation axis 23 as a supporting point. Specifically, the balance weight 29 is fixed at a desired position of the measurement arm 24 by a screw. Alternatively, a male screw may be formed on the measurement arm 24 and the balance weight 29 may be position-adjustably screwed to the male screw.

Figure 4:
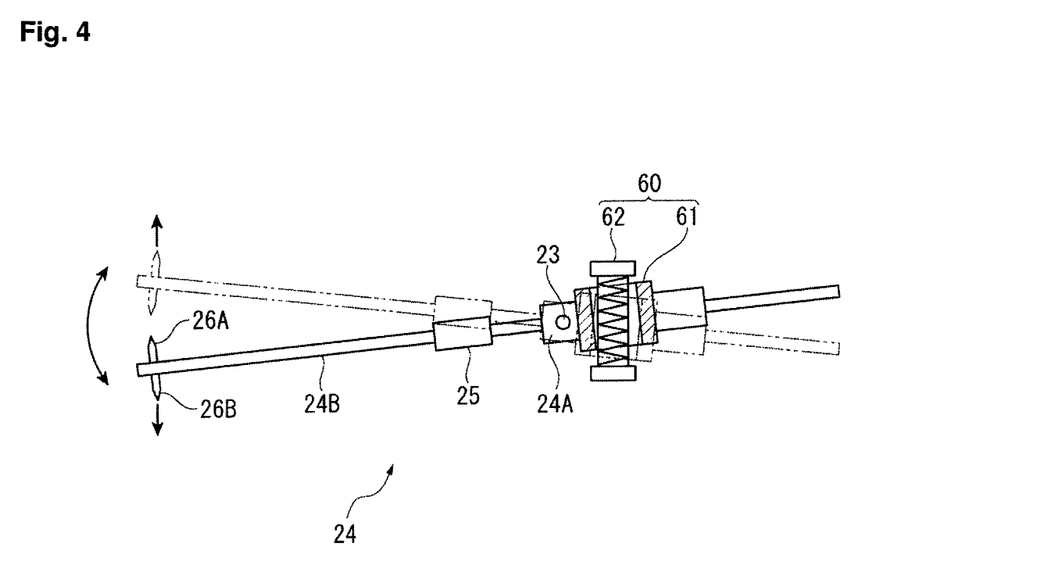
FIG. 4 illustrates the measurement arm and a measurement arm posture switching mechanism of the same embodiment.

As shown in FIG. 4, the measurement arm posture switching mechanism 60 is configured with a tubular magnet 61 and a voice coil 62. The magnet 61 is provided in the middle of the first measurement arm 24A. The voice coil 62 passes through the interior of the magnet 61, is fixed to the bracket 22 acting as the main body, and urges the measurement arm 24 in one direction (upward) or the other direction (downward) of the circular arc motion direction pivoting on the rotation axis 23. The measurement arm posture switching mechanism 60 is controlled by a command from a measurement posture and measurement force control circuit 70. When an electric current flows in the voice coil 62 in response to the command from the measurement posture and measurement force control circuit 70, the magnet 61 of the measurement arm 24 is attracted to the voice coil 62 due to an electromagnetic force generated from the voice coil 62 and a magnetic force of the magnet 61. The posture of the measurement arm 24 is thus switched to a posture in which the tip of the measurement arm 24 is urged upward or downward. In this embodiment, the measurement arm posture switching mechanism 60 includes the voice coil 62 urging the measurement arm 24 in the circular arc motion direction pivoting on the rotation axis 23 and also serves as a measurement force applier that applies a measurement force to the styli 26A and 26B by urging the measurement arm 24 in the circular arc motion direction.

Figure 5:
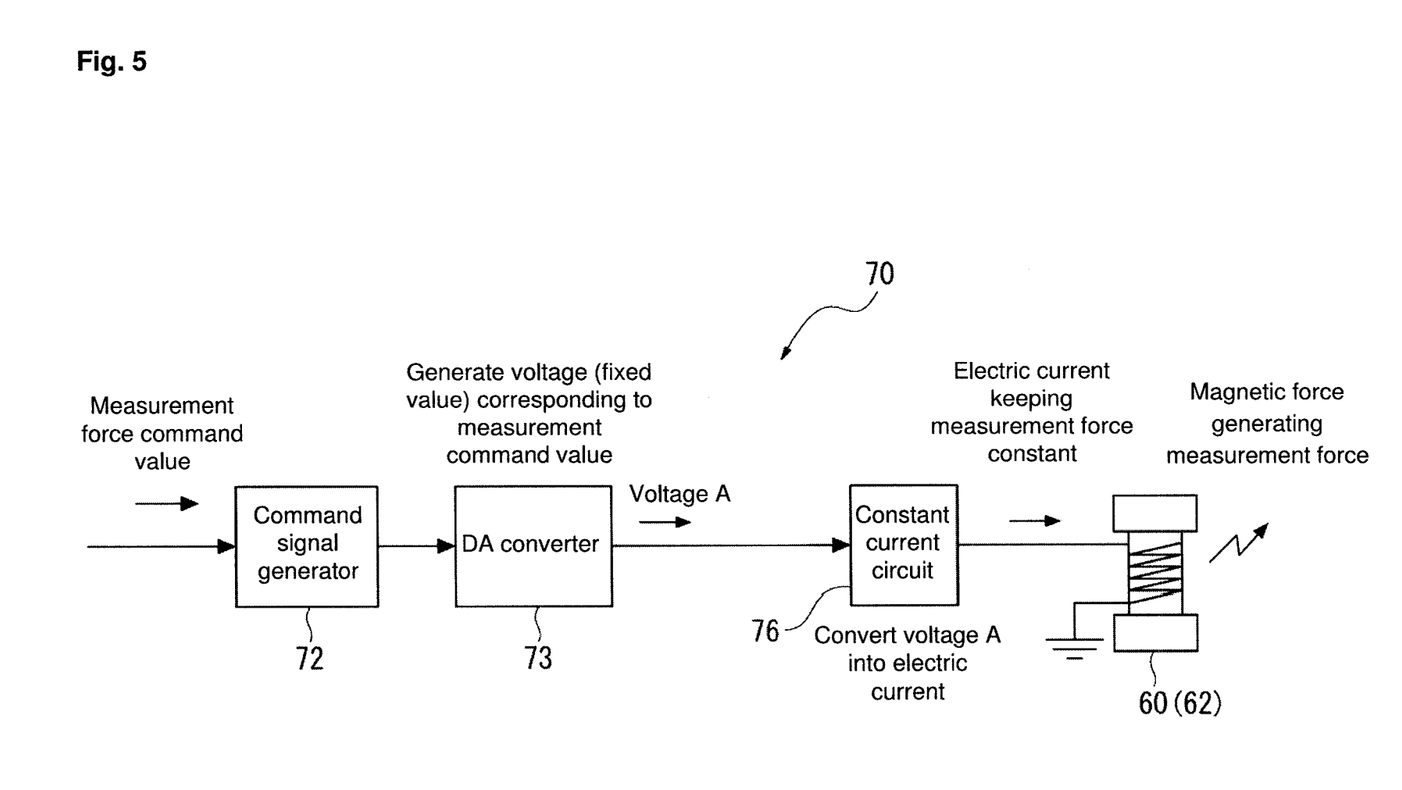
FIG. 5 illustrates a measurement posture and measurement force control circuit of the same embodiment.

As shown in FIG. 5, the measurement posture and measurement force control circuit 70 includes a command signal generator 72, a digital-to-analog converter 73, and a constant current circuit 76. The command signal generator 72 generates a voltage corresponding to a measurement force command value output from a control device 101 (described later). The digital-to-analog converter 73 converts the voltage (digital signal) from the command signal generator 72 into an analog signal. The constant current circuit 76 converts the voltage from the digital-to-analog converter 73 into an electric current and applies the electric current to the voice coil 62 of the measurement arm posture switching mechanism 60.

Figure 6:
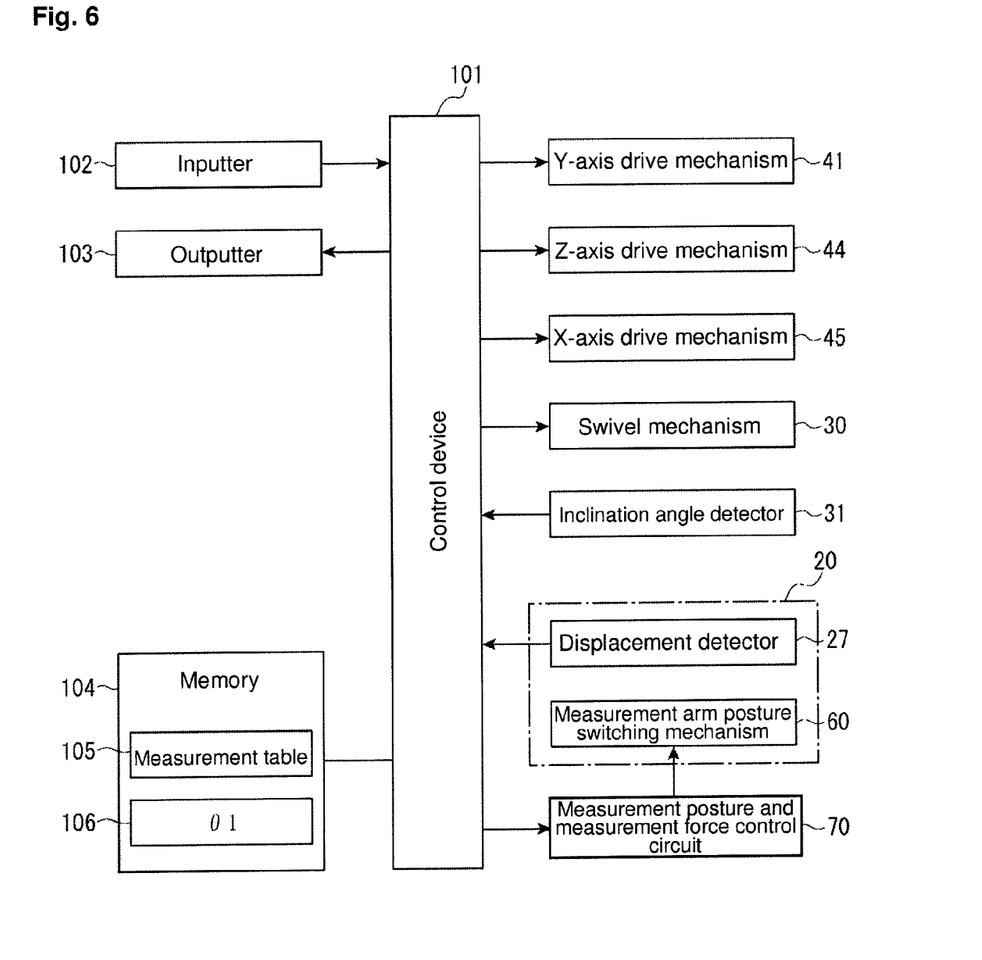
FIG. 6 is a block diagram showing a control system of the same embodiment.

FIG. 6 illustrates a control system for the present surface texture measuring apparatus. The control device (controller) 101 is connected with the Y-axis drive mechanism 41, the Z-axis drive mechanism 44, the X-axis drive mechanism 45, the swivel mechanism 30, an inclination angle detector 31 detecting an inclination angle of the X-axis drive mechanism 45, the displacement detector 27 included in the stylus displacement detector 20, and the measurement arm posture switching mechanism 60 (via the measurement posture and measurement force control circuit 70). The control device 101 is further connected with an inputter 102, an outputter 103, a memory device 104, and the like. The inclination angle detector 31 configures an inclination angle information provider that provides information on an inclination angle $\theta 1$ of the stylus displacement detector 20 inclined by the swivel mechanism 30.

Figure 7:
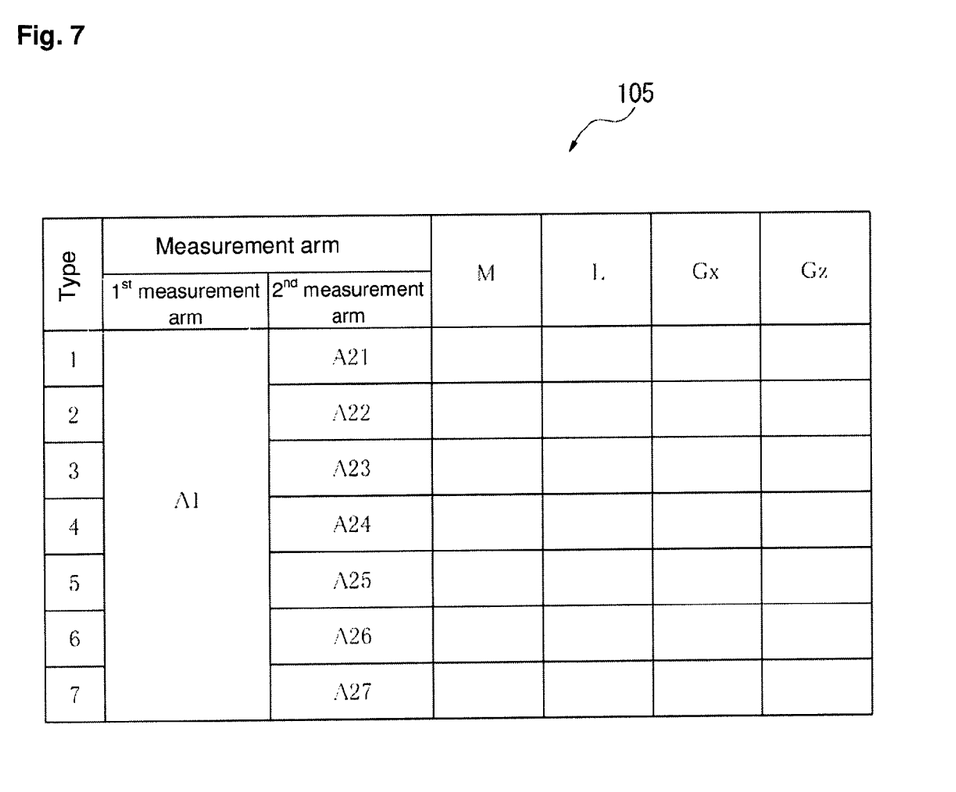
FIG. 7 illustrates a measurement arm table of the same embodiment.
Figure 8:
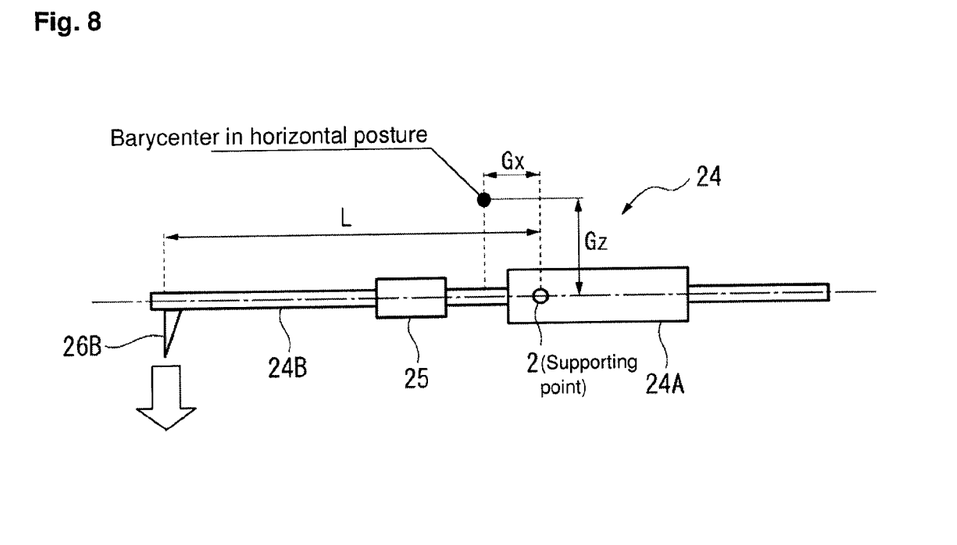
FIG. 8 illustrates parameters of the measurement arm of the same embodiment.

The memory device 104 is provided with a measurement arm table 105 and an inclination angle memory 106 in addition to a memory that stores data detected by the displacement detector 27. As shown in FIG. 7, the measurement arm table 105 stores a mass M of the entire measurement arm 24, an arm length L from a supporting point (rotation axis 23) of the measurement arm 24 to the styli 26A and 26B, and a horizontal barycenter Gx (X-axis direction position from the supporting point) and a vertical direction barycenter Gz (Z-axis direction position from the supporting point) of the measurement arm 24 in a horizontal posture, for each type of the measurement arm 24 in which a second measurement arm 24B (A21 to A27) having a different mass is attached. Further, FIG. 8 illustrates the arm length L, the horizontal barycenter Gx, and the vertical barycenter Gz of the measurement arm 24 in the horizontal posture.

The inclination angle memory 106 stores the inclination angle $\theta 1$ of the X-axis drive mechanism 45 detected by the inclination angle detector 31. From the inputter 102, information specifying the type of the measurement arm 24 is input. In this embodiment, the inputter 102 also serves as a measurement arm specifier.

The control device 101 reads out from the measurement arm table 105 the mass M, the arm length L, the horizontal barycenter Gx, and the vertical barycenter Gz for the measurement arm 24 specified by the inputter 102. Based on this information and the inclination angle $\theta 1$ information provided from the inclination angle memory 106, the control device 101 calculates a difference between a measurement force of the measurement arm 24 in the horizontal posture and a measurement force of the measurement arm 24 in the inclined posture. Using this difference as a correction value, the control device 101 then adjusts a measurement force of the measurement arm posture switching mechanism 60 acting as a measurement force applier. Specifically, from the mass M of the entire measurement arm, the arm length L, the horizontal barycenter Gx, the vertical barycenter Gz, and the inclination angle $\theta 1$ of the detector, the difference between the measurement force of the measurement arm 24 in the horizontal posture and the measurement force of the measurement arm 24 in the inclined posture is obtained with the following formula (1):

$$\text{Difference} = M \times L \times (Gx - Gx') \quad (1)$$

where $$Gx' = \sqrt{(Gx^2 + Gz^2)} \times \cos(\theta 3) \quad (2)$$

$$\theta 3 = \theta 2 - \theta 1 \quad (3)$$

$$\theta 2 = \text{Arctan}(Gz \div Gx) \quad (4)$$

Further, the control device 101 configures a balance adjuster that adjusts the balance of the measurement arm 24 by adjusting an electric current conducted in the voice coil 62 of the measurement arm posture switching mechanism 60 when the second measurement arm 24B is replaced with respect to the first measurement arm 24A. Specifically, the control device 101 configures the balance adjuster that adjusts the electric current conducted in the voice coil 62 while monitoring the circular arc motion amount of the measurement arm 24 detected by the displacement detector 27 and that completes the balance adjustment when the circular arc motion amount of the measurement arm 24 reaches a predetermined set value.

<Explanation of Measurement Method (See FIG. 9)>

In performing measurement, the second measurement arm 24B is replaced with one having the styli 26A and 26B appropriate for the measurement surface of the measured object. To do so, the replacing second measurement arm 24B is pulled and held by the first measurement arm 24A via the attach-detach mechanism 25. Subsequently, the swivel mechanism 30 is spun such that the movement direction of the X-axis drive mechanism 45 is parallel to the measurement surface of the measured object. Since the stylus displacement detector 20 tilts along with the X-axis drive mechanism 45 when the swivel mechanism 30 is swirled, the movement direction of the X-axis drive mechanism 45 is adjusted to be parallel to the measurement surface of the measured object. Then, the inclination angle $\theta 1$ of the X-axis drive mechanism 45 and the stylus displacement detector 20 is detected by the inclination angle detector 31 and is stored in the inclination angle memory 106.

Thereafter, the stylus 26B of the measurement arm 24 is positioned on the upper surface of the measured object. The type of the measurement arm 24 including the post-replacement second measurement arm 24B is then input through the inputter 102. Then, the control device 101 reads out from the measurement arm table 105 the mass M, the arm length L, the horizontal barycenter Gx, and the vertical barycenter Gz corresponding to the input type of the measurement arm 24. Based on this information and the inclination angle $\theta 1$ stored in the inclination angle memory 106, a difference between a measurement force of the measurement arm 24 in the horizontal posture and a measurement force of the measurement arm 24 in the inclined posture is obtained with the following formula (1):

$$\text{Difference} = M \times L \times (Gx - Gx') \quad (1)$$

where $$Gx' = \sqrt{(Gx^2 + Gz^2)} \times \cos(\theta 3) \quad (2)$$

$$\theta 3 = \theta 2 - \theta 1 \quad (3)$$

$$\theta 2 = \text{Arctan}(Gz \div Gx) \quad (4)$$

Figure 9:
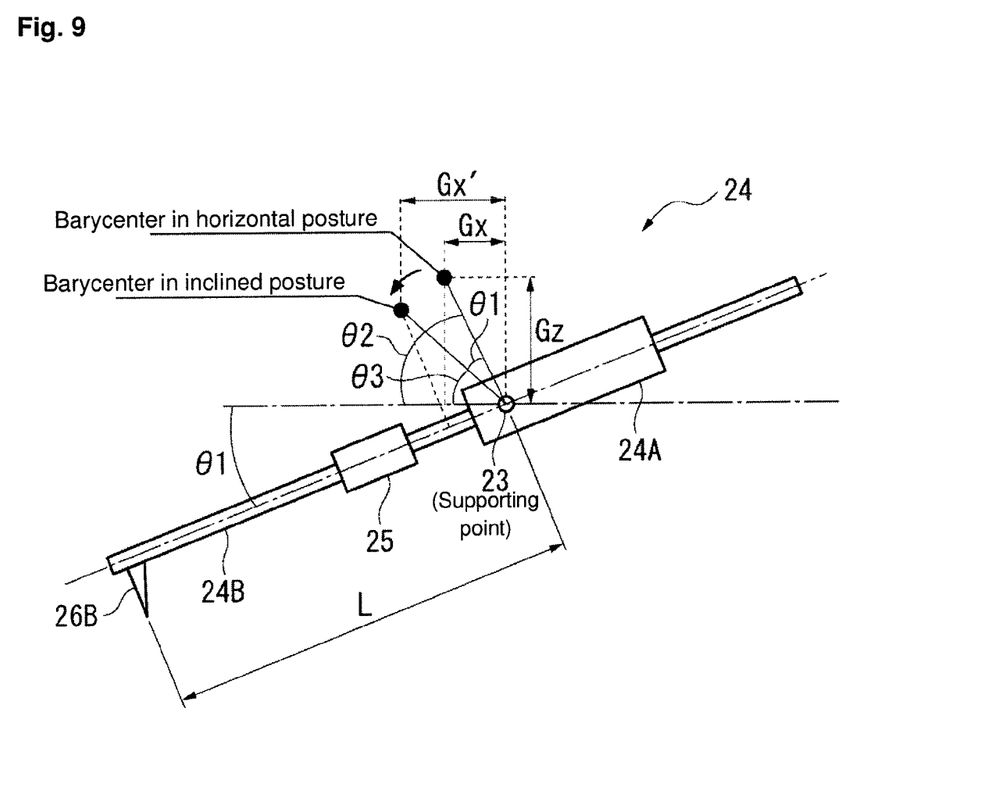
FIG. 9 illustrates the parameters of the measurement arm in an inclined posture of the same embodiment.

Further, FIG. 9 illustrates the barycenter Gx' and $\theta 1$ to $\theta 3$ of the measurement arm 24 in the inclined posture.

Subsequently, the control device 101 provides a measurement force command value, which is a corrected calculated difference, to the measurement posture and measurement force control circuit 70. Then, the measurement posture and measurement force control circuit 70 applies an electric current corresponding to the measurement force command value to the voice coil 62 of the measurement arm posture switching mechanism 60. As a result, the stylus 26B is brought into contact with the measurement surface of the measured object at the measurement force command value. In this state, the relative displacement mechanism 40 relatively displaces the stylus displacement detector 20 and the stage 10 in the axis direction of the measurement arm 24. The displacement detector 27 then detects the circular arc motion amount of the measurement arm 24. Based on the circular arc motion amount, the surface texture of the measured object is measured.

<Effect of Embodiment>

According to the present embodiment, by specifying the type of the measurement arm 24, it is possible to calculate and obtain a most appropriate measurement force from the mass M, the arm length L, the horizontal barycenter Gx, the vertical barycenter Gz, and the inclination angle $\theta 1$. Thus, it is possible to perform accurate measurement on a measurement surface of a measured object having any angle. Further, required memory capacity can be reduced since only one set of parameters (the mass M of the entire measurement arm, the arm length L, the horizontal barycenter Gx, and the vertical barycenter Gz) for each type of the measurement arm 24 including the second measurement arm 24B needs to be stored. In addition, when a user wants to use a new measurement arm 24, the user does not need to register the measurement force command value thereof. Instead, the user only needs to register parameters (the mass M of the entire measurement arm, the arm length L, the horizontal barycenter Gx, and the vertical barycenter Gz), which the user can relatively easily obtain. Thus, the workload of the user can be reduced.

In particular, since the present embodiment includes the inclination angle detector 31 that detects the inclination angle of the stylus displacement detector 20, it is possible to automatically detect the inclination angle of the stylus displacement detector 20. Accordingly, it is not necessary for a user to manually input the inclination angle of the stylus displacement detector 20 through the inputter 102. Thereby, the burden of the user can be reduced.

<Modified Embodiment (See FIGS. 10 and 11)>

The present invention is not limited to the above-described embodiment, and modifications and improvements thereon are included in the present invention as long as the advantage of the present invention can be achieved. In the above-described embodiment, in performing measurement, the type of the measurement arm 24 including the post-replacement second measurement arm 24B is input through the inputter 102. However, using the balance adjuster in the control device 101, a mass of an entire measurement arm including a post-replacement second measurement arm may be calculated. By reading out from the measurement arm table 105 the arm length L, the horizontal barycenter Gx, and the vertical barycenter Gz of the measurement arm 24 corresponding to the calculated mass, a calculation may be further performed. The balance adjuster of the control device 101 herein configures a mass calculator.

Figure 10:
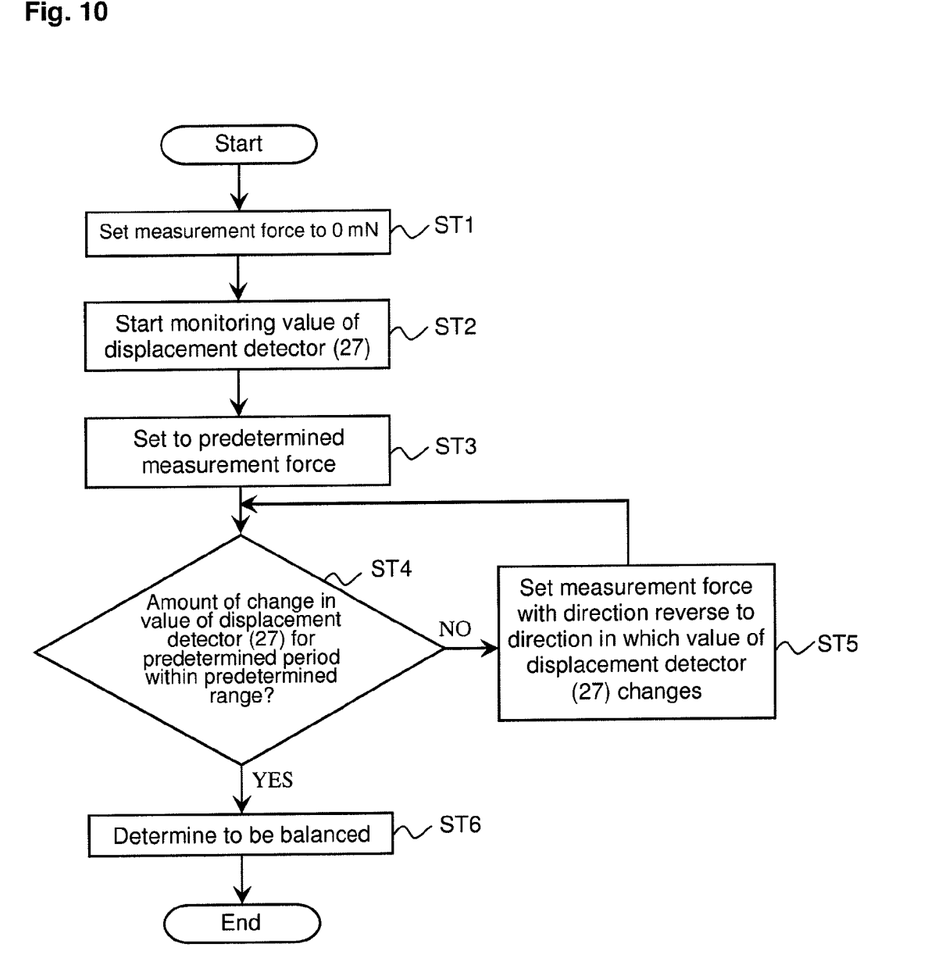
FIG. 10 is a flowchart showing steps to adjust balance of a reference measurement arm of another embodiment.

Specifically, a series of processes shown in FIG. 10 is first performed with respect to a reference measurement arm (measurement arm in which the second measurement arm 24B having a reference mass is attached to the first measurement arm 24A). In Step (abbreviated as ST, hereinafter) 1, the control device 101 outputs a setting command for a measurement force of 0 mN. Thereafter, monitoring on a value of the displacement detector 27 is started in ST 2. After outputting a setting command for a given measurement force in ST 3, the control device 101 checks whether an amount of change in the value of the displacement detector 27 for a predetermined time period is within a predetermined range in ST 4. In ST 4, in a case where the amount of change in the value of the displacement detector 27 for the predetermined period is not within the predetermined range, that is, in a case where the reference measurement arm 24 greatly loses its balance, the processing proceeds to ST 5. The setting command for a measurement force is output with a direction reverse to a direction in which the value of the displacement detector 27 changes. In ST 4, the processing of ST 5 is repeated until the amount of change in the value of the displacement detector 27 for the predetermined time period becomes a value within the predetermined range. In ST 4, when the amount of change in the value of the displacement detector 27 for the predetermined time period becomes a value within the predetermined range, it is determined that the measurement arm 24 is balanced in ST 6, and the processing is completed.

Figure 11:
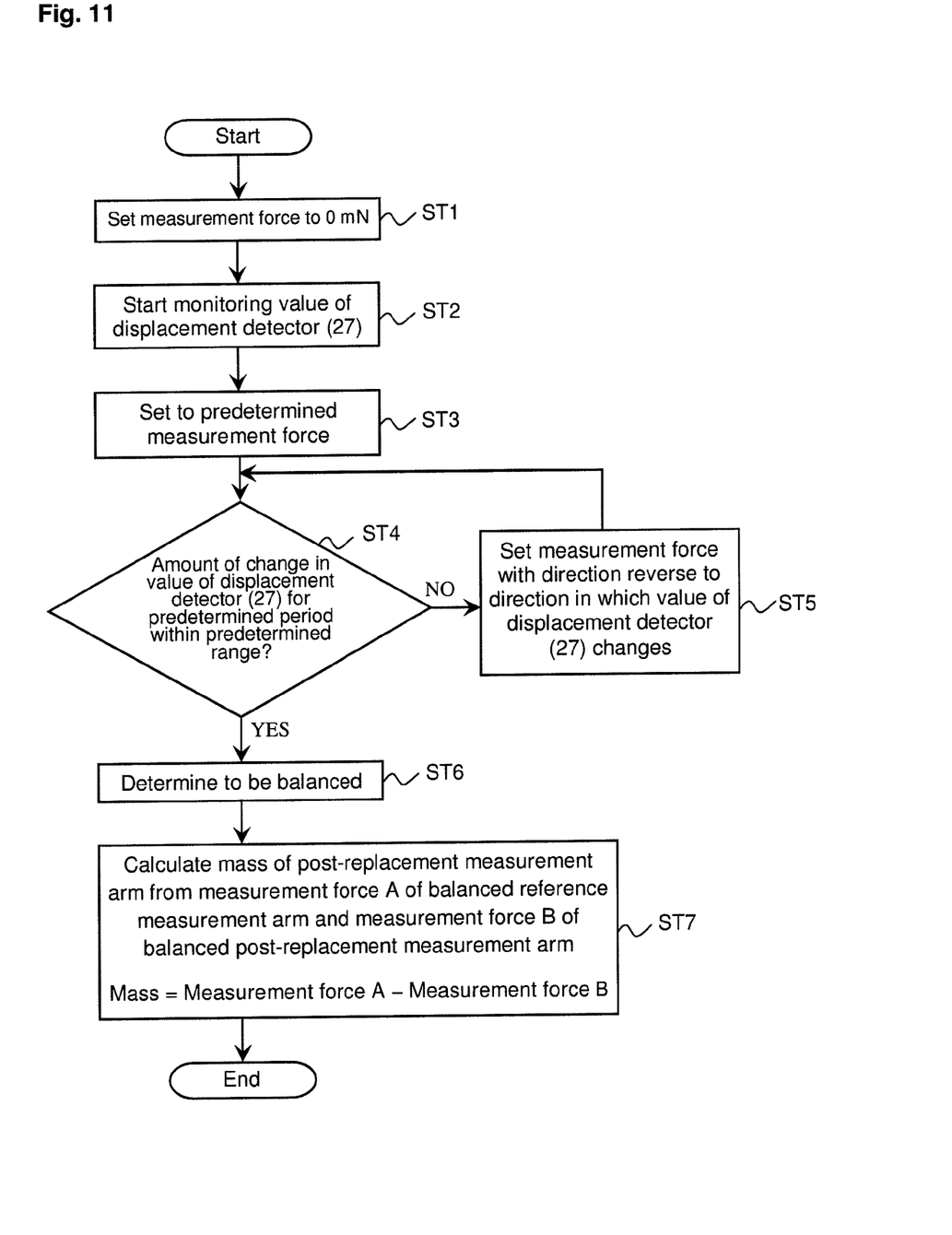
FIG. 11 is a flowchart showing steps to obtain a mass of a post-replacement measurement arm of another embodiment.

Subsequently, a series of processes shown in FIG. 11 is performed with respect to a post-replacement measurement arm 24. The series of processes from ST 1 to ST 6 is the same as that in FIG. 10. In ST 7, a measurement force A for the balanced reference measurement arm 24 and a measurement force B for the balanced post-replacement measurement arm 24 are compared, and the mass of the post-replacement measurement arm 24 is calculated by the following formula.

Mass of post-replacement measurement arm=Measurement force $A$−Measurement force $B$ In other words, while the circular arc motion amount of the measurement arm 24 detected by the displacement detector 27 is monitored, the electric current conducted in the voice coil 62 is adjusted. Then, by comparing a measurement force in a state where the circular arc motion amount of the reference measurement arm 24 has become a predetermined set value and a measurement force in a state where the circular arc motion amount of the post-replacement measurement arm 24 has become a predetermined set value, the mass of the post-replacement measurement arm 24 is obtained. Thereby, it is not necessary for a user to specify the measurement arm 24 including the second measurement arm 24B. Accordingly, it is possible to eliminate specifying errors and to reduce the user's burden.

In the above-described embodiment, the inclination angle θ1 of the stylus displacement detector 20 and the X-axis drive mechanism 45 is detected by the inclination angle detector 31, and the control device 101 performs calculation using the detected inclination angle θ1. However, the inclination angle θ1 of the stylus displacement detector 20 and the X-axis drive mechanism 45 may be manually input through the inputter 102.

In the above-described embodiment, the measurement arm posture switching mechanism 60 has a configuration including the voice coil 62 that urges the measurement arm 24 in one or the other direction of the circular arc motion direction pivoting on the rotation axis 23 as a supporting point, however, the configuration of the measurement arm posture switching mechanism 60 is not limited to this. For example, a mechanism using a linear motor mechanism may be employed. In addition, although the circular arc motion is performed in the vertical direction in the above-described embodiment, it may be performed in the horizontal direction. Alternatively, a configuration is also possible in which swing motion is performed in a diagonal direction other than the vertical and horizontal directions.

In the above-described embodiment, the second measurement arm 24B having the pair of styli 26A and 26B at the tip of the measurement arm 24 has been explained. However, the configuration does not need to include the pair of styli. As long as a measurement arm can be replaced to one having a stylus appropriate for a measured portion, any configuration may be employed.

Further, the relative displacement mechanism 40 is configured to be capable of moving the stage 10 in the Y-axis direction and the stylus displacement detector 20 in the X-axis direction and the Z-axis direction. However, the configuration is not limited to the above. In essence, as long as the stage 10 and the stylus displacement detector 20 can move in three-dimensional directions, either of them may move.

The present invention may be used when measurement is performed on an inclined surface or the like of a measured object.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface texture measuring apparatus comprising:
   a detector comprising:
      a measurement arm supported by a main body and configured to move in a circular arc pivoting on a supporting axis as a supporting point and provided with a stylus at a tip;
      a displacement detector configured to detect an amount of circular arc motion of the measurement arm; and
      a measurement force applier configured to urge the measurement arm in a circular arc motion direction, the measurement force applier further configured to apply a measurement force to the stylus;
   a stage configured to carry a measured object;
   a relative displacer comprising a detector displacer configured to move the detector in an axis direction of the measurement arm, the relative displacer further configured to relatively move the detector and the stage;
   a detector inclinator tilting a movement direction of the detector displacer with respect to the stage, wherein:
      in a state where the stylus is in contact with a surface of the measured object, the displacement detector detects the amount of circular arc motion of the measurement arm while the relative displacer relatively moves the detector and the stage;

a surface texture of the measured object is measured based on the amount of circular arc motion amount; and the measurement arm comprises a first measurement arm supported by the main body in a state capable of performing circular arc motion pivoting on the supporting axis as a supporting point, and a second measurement arm attachably and detachably provided at a tip of the first measurement arm via an attacher-detacher and having the stylus at a tip;

a memory configured to store a mass M of an entirety of the measurement arm, an arm length L from the supporting point to the stylus, and a horizontal barycenter Gx and a vertical barycenter Gz of the measurement arm in a horizontal position, for each type of the measurement arm in which the second measurement arm having a different mass is attached;

a measurement arm specifier configured to specify the type of the measurement arm;

an inclination angle information provider configured to provide information on an inclination angle of the detector inclined by the detector inclinator; and a controller configured to:
read out from the memory the mass M, the arm length L, the horizontal barycenter Gx, and the vertical barycenter Gz for the measurement arm specified by the measurement arm specifier;
calculate a difference between a measurement force of the measurement arm in the horizontal position and a measurement force of the measurement arm in an inclined position based on the information from the memory and the inclination angle information from the inclination angle information provider, and
adjust a measurement force of the measurement force applier using the difference as a correction value.

2. The surface texture measuring apparatus according to claim 1, wherein the inclination angle information provider comprises an inclination angle detector configured to detect an inclination angle of the detector.

3. The surface texture measuring apparatus according to claim 2, wherein the controller is further configured to obtain the difference between the measurement force of the measurement arm in the horizontal position and the measurement force of the measurement arm in the inclined position from the mass M of the entire measurement arm, the arm length L, the horizontal barycenter Gx, the vertical barycenter Gz, and an inclination angle $\theta 1$ of the detector with a formula:

Difference=$M \times L \times (Gx-Gx')$ where $Gx'=\sqrt{(Gx^2+Gz^2)} \times \cos(\theta 3)$ $\theta 3=\theta 2-\theta 1$ $\theta 2=\text{Arctan}(Gz \div Gx)$.

4. The surface texture measuring apparatus according to claim 3, wherein:
the measurement arm specifier comprises a mass calculator configured to obtain the mass of the entirety of the measurement arm including a post-replacement second measurement arm when the second measurement arm is replaced with respect to the first measurement arm; and
the controller is further configured to perform calculation by reading out from the memory the arm length L, the horizontal barycenter Gx, and the vertical barycenter Gz, for the measurement arm corresponding to the mass calculated by the mass calculator.

5. The surface texture measuring apparatus according to claim 4, wherein:
the measurement force applier includes a voice coil configured to urge the measurement arm in the circular arc motion direction pivoting on the supporting axis as a supporting point; and
the mass calculator is configured to adjust an electric current conducted in the voice coil while monitoring the amount of circular arc motion of the measurement arm detected by the displacement detector and obtains the mass of the post-replacement measurement arm by comparing a measurement force in a state where the circular arc motion amount of the measurement arm to serve as a reference has become a predetermined set value and a measurement force in a state where the circular arc motion of the post-replacement measurement arm has become a predetermined set value.

6. The surface texture measuring apparatus according to claim 2, wherein:
the measurement arm specifier comprises a mass calculator configured to obtain the mass of the entirety of the measurement arm including a post-replacement second measurement arm when the second measurement arm is replaced with respect to the first measurement arm; and
the controller is further configured to perform calculation by reading out from the memory the arm length L, the horizontal barycenter Gx, and the vertical barycenter Gz, for the measurement arm corresponding to the mass calculated by the mass calculator.

7. The surface texture measuring apparatus according to claim 6, wherein:
the measurement force applier includes a voice coil configured to urge the measurement arm in the circular arc motion direction pivoting on the supporting axis as a supporting point; and
the mass calculator is configured to adjust an electric current conducted in the voice coil while monitoring the amount of circular arc motion of the measurement arm detected by the displacement detector and obtains the mass of the post-replacement measurement arm by comparing a measurement force in a state where the circular arc motion amount of the measurement arm to serve as a reference has become a predetermined set value and a measurement force in a state where the circular arc motion of the post-replacement measurement arm has become a predetermined set value.

8. The surface texture measuring apparatus according to claim 1, wherein the controller is further configured to obtain the difference between the measurement force of the measurement arm in the horizontal position and the measurement force of the measurement arm in the inclined position from the mass M of the entire measurement arm, the arm length L, the horizontal barycenter Gx, the vertical barycenter Gz, and an inclination angle $\theta 1$ of the detector with a formula:

Difference=$M \times L \times (Gx-Gx')$ where $Gx'=\sqrt{(Gx^2+Gz^2)} \times \cos(\theta 3)$ $\theta 3=\theta 2-\theta 1$ $\theta 2=\text{Arctan}(Gz \div Gx)$.

9. The surface texture measuring apparatus according to claim 8, wherein:
  the measurement arm specifier comprises a mass calculator configured to obtain the mass of the entirety of the measurement arm including a post-replacement second measurement arm when the second measurement arm is replaced with respect to the first measurement arm; and
  the controller is further configured to perform calculation by reading out from the memory the arm length L, the horizontal barycenter Gx, and the vertical barycenter Gz, for the measurement arm corresponding to the mass calculated by the mass calculator.

10. The surface texture measuring apparatus according to claim 9, wherein:
  the measurement force applier includes a voice coil configured to urge the measurement arm in the circular arc motion direction pivoting on the supporting axis as a supporting point; and
  the mass calculator is configured to adjust an electric current conducted in the voice coil while monitoring the amount of circular arc motion of the measurement arm detected by the displacement detector and obtains the mass of the post-replacement measurement arm by comparing a measurement force in a state where the circular arc motion amount of the measurement arm to serve as a reference has become a predetermined set value and a measurement force in a state where the circular arc motion of the post-replacement measurement arm has become a predetermined set value.

11. The surface texture measuring apparatus according to claim 1, wherein:
  the measurement arm specifier comprises a mass calculator configured to obtain the mass of the entirety of the measurement arm including a post-replacement second measurement arm when the second measurement arm is replaced with respect to the first measurement arm; and
  the controller is further configured to perform calculation by reading out from the memory the arm length L, the horizontal barycenter Gx, and the vertical barycenter Gz, for the measurement arm corresponding to the mass calculated by the mass calculator.

12. The surface texture measuring apparatus according to claim 11, wherein:
  the measurement force applier includes a voice coil configured to urge the measurement arm in the circular arc motion direction pivoting on the supporting axis as a supporting point; and
  the mass calculator is configured to adjust an electric current conducted in the voice coil while monitoring the amount of circular arc motion of the measurement arm detected by the displacement detector and obtains the mass of the post-replacement measurement arm by comparing a measurement force in a state where the circular arc motion amount of the measurement arm to serve as a reference has become a predetermined set value and a measurement force in a state where the circular arc motion of the post-replacement measurement arm has become a predetermined set value.

* * * * *